United States Patent
Friedlander et al.

(10) Patent No.: US 11,272,238 B2
(45) Date of Patent: Mar. 8, 2022

(54) ELECTRONIC MESSAGING DISPLAY OPTIMIZATION

(71) Applicant: INTERNATIONAL BUSINESS MACHINES CORPORATION, Armonk, NY (US)

(72) Inventors: Robert R. Friedlander, Southbury, CT (US); Erik H. Katzen, Argyle, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 1661 days.

(21) Appl. No.: 14/473,533

(22) Filed: Aug. 29, 2014

(65) Prior Publication Data
US 2016/0066012 A1    Mar. 3, 2016

(51) Int. Cl.
| H04N 21/20 | (2011.01) |
| H04N 21/414 | (2011.01) |
| H04L 51/046 | (2022.01) |
| H04N 21/4223 | (2011.01) |
| H04N 21/81 | (2011.01) |
| H04N 21/488 | (2011.01) |

(Continued)

(52) U.S. Cl.
CPC ..... H04N 21/41415 (2013.01); G06F 16/285 (2019.01); G06F 16/738 (2019.01); G06K 9/6278 (2013.01); G06V 20/52 (2022.01); H04L 51/046 (2013.01); H04N 21/23418 (2013.01); H04N 21/4223 (2013.01); H04N 21/4882 (2013.01); H04N 21/814 (2013.01); H04N 21/8126 (2013.01); G06V 2201/08 (2022.01); H04N 21/25883 (2013.01); H04N 21/44213 (2013.01); H04N 21/8133 (2013.01)

(58) Field of Classification Search
CPC ....... H04N 21/41415; H04N 21/23418; H04N 21/4223; H04N 21/4882; H04N 21/8126; H04N 21/814; H04N 21/25883; H04N 21/44213; H04N 21/8133; G06F 16/285; G06F 16/738; G06K 9/00771; G06K 9/6278; G06K 2209/23
See application file for complete search history.

(56) References Cited

U.S. PATENT DOCUMENTS

| 5,214,793 A | 5/1993 | Conway et al. |
| 8,595,965 B2 | 12/2013 | Sipperley et al. |

(Continued)

OTHER PUBLICATIONS

P. Mell et al., "The NIST Definition of Cloud Computing", Version 15, National Institute of Standards and Technology, Information Technology Laboratory, Oct. 7, 2009, pp. 1-2.

*Primary Examiner* — David J Stoltenberg
(74) *Attorney, Agent, or Firm* — Law Office of Jim Boice

(57) ABSTRACT

A method, system, and/or computer program product optimize a display of messages on a public electronic video display. A video camera captures images of multiple mobile vehicles that are traversing a vehicular pathway, which is physically proximate to a public electronic video display. The multiple mobile vehicles are categorized into a specific vehicle category based on captured images of the multiple mobile vehicles. The specific vehicle category is matched to a particular set of multiple video display messages. A video display message is displayed on the public electronic video display based on the specific vehicle category.

15 Claims, 6 Drawing Sheets

(51) Int. Cl.
*G06F 16/28* (2019.01)
*H04N 21/234* (2011.01)
*G06K 9/62* (2022.01)
*G06F 16/738* (2019.01)
*G06V 20/52* (2022.01)
*H04N 21/442* (2011.01)
*H04N 21/258* (2011.01)

(56) References Cited

U.S. PATENT DOCUMENTS

| | | | |
|---|---|---|---|
| 2004/0036622 A1* | 2/2004 | Dukach | G06Q 30/02 340/691.6 |
| 2006/0143082 A1* | 6/2006 | Ebert | G06Q 30/02 705/14.72 |
| 2011/0131153 A1 | 6/2011 | Grim, III et al. | |
| 2012/0054028 A1* | 3/2012 | Tengler | G06Q 30/02 705/14.49 |
| 2014/0046775 A1 | 2/2014 | Harb | |
| 2014/0229255 A1* | 8/2014 | Scofield | G06Q 30/0207 705/14.21 |
| 2014/0310103 A1* | 10/2014 | Ricci | H04W 4/40 705/14.62 |
| 2015/0317687 A1* | 11/2015 | Ramesh | G06Q 30/0269 705/14.66 |

\* cited by examiner

ELECTRONIC MESSAGING DISPLAY OPTIMIZATION

BACKGROUND

The present disclosure relates to the field of messaging boards, including public electronic video displays. Still more particularly, the present disclosure relates to managing the content of material displayed on public electronic video displays.

Original billboards, which were typically located next to highways and other roadways, had fixed content. That is, original billboards were made of one or more panels, which were painted or decaled to present advertisements, messages, etc. In order to present a new message, the billboard (or the panels that make up the billboard) would have to be removed, repainted, replaced, and/or otherwise physically altered. However, many modern billboards are now electronic video displays, thus allowing messages/content to be more easily changed.

SUMMARY

In one embodiment of the present invention, a method and/or computer program product optimizes a display of messages on a public electronic video display. A video camera captures images of multiple mobile vehicles that are traversing a vehicular pathway, which is physically proximate to a public electronic video display. The multiple mobile vehicles are categorized into a specific vehicle category based on captured images of the multiple mobile vehicles. The specific vehicle category is matched to a particular set of multiple video display messages. A video display message is displayed on the public electronic video display based on the specific vehicle category.

In one embodiment of the present invention, a computer system comprises: a hardware processor, a computer readable memory, and a computer readable storage medium; first program instructions to capture, by a video camera, images of multiple mobile vehicles that are traversing a vehicular pathway, wherein the vehicular pathway is physically proximate to a public electronic video display; second program instructions to categorize the multiple mobile vehicles into a specific vehicle category based on captured images of the multiple mobile vehicles; third program instructions to match the specific vehicle category to a particular set of multiple video display messages; and fourth program instructions to display the video display message from the particular set of multiple video display messages on the public electronic video display based on the specific vehicle category; and wherein the first, second, third, and fourth program instructions are stored on the computer readable storage medium and executed by the processor via the computer readable memory.

DETAILED DESCRIPTION

Figure 1:
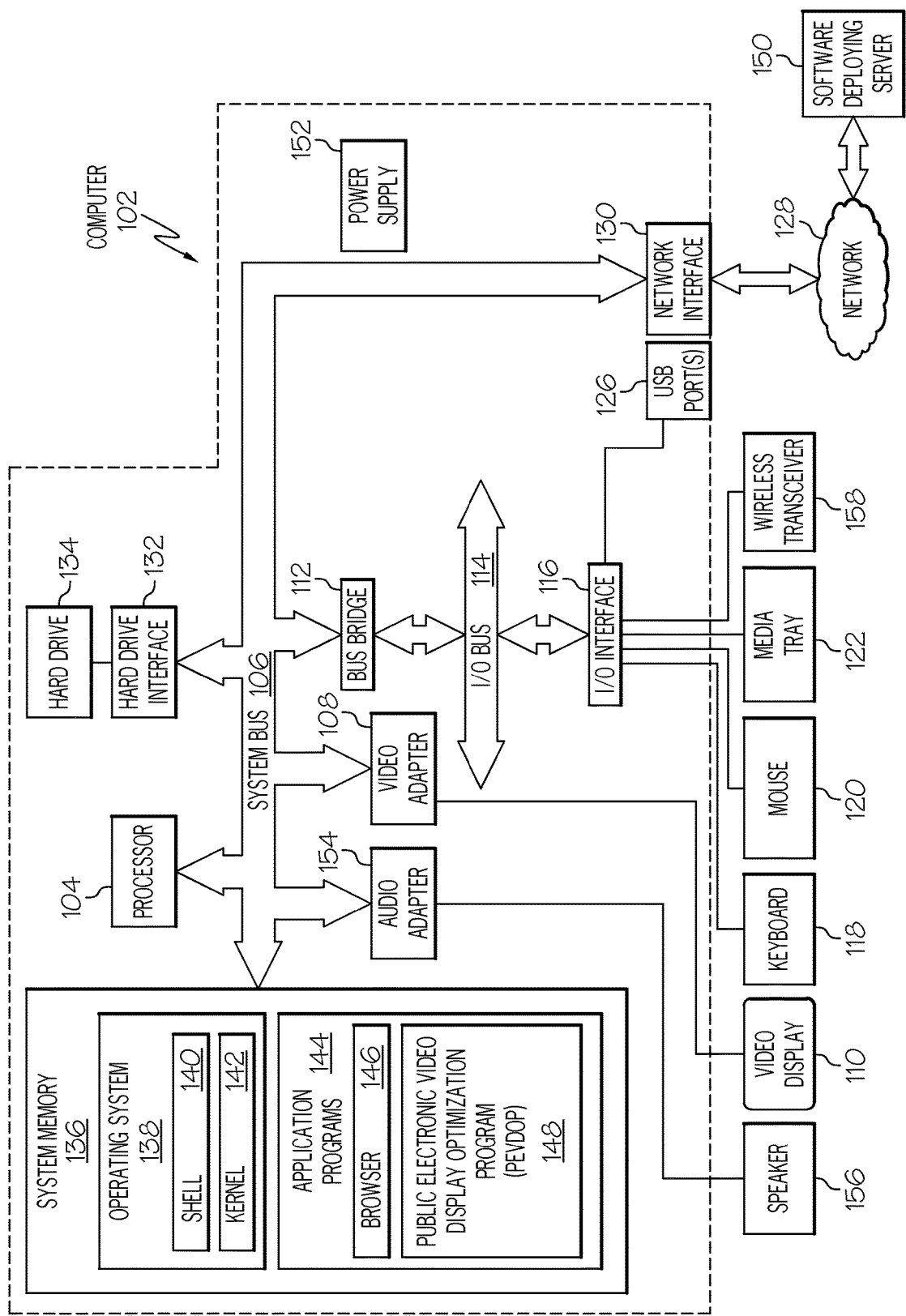
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150, and/or public electronic video display controller 202 and/or Vehicle Determination System (VDS) 204 and/or broadcast media wireless transmitter 206 and/or video camera 208 and/or public electronic video display 210 and/or receiver 212 and/or transmitter 214 and/or location transceiver 222 shown in FIG. 2.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a wireless transceiver 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Public Electronic Video Display Optimization Program (PEVDOP) 148. PEVDOP 148 includes code for implementing the processes described below, including those described in FIGS. 2-3. In one embodiment, computer 102 is able to download PEVDOP 148 from software deploying server 150, including in an on-demand basis, wherein the code in PEVDOP 148 is not downloaded until needed for execution. Note further that, in one embodiment of the present invention, software deploying server 150 performs all of the functions associated with the present invention (including execution of PEVDOP 148), thus freeing computer 102 from having to use its own internal computing resources to execute PEVDOP 148.

Computer 102 also includes a power supply 152, which provides alternating current (AC) and/or direct current (DC) to one or more of the components shown for computer 102. In on embodiment in which AC current is required by a component shown in computer 102, such AC power may be provided from any AC source, such as a state or municipal power grid (not shown). In one embodiment in which DC current is required for a component shown in computer 102, such DC power may be provided by a local DC battery, and/or an AC/DC converter for converting AC power into usable DC voltage (i.e., low DC voltage).

In one embodiment, computer 102 also includes an audio adapter 154, which provides a requisite interface to a speaker 156, thus allowing digital/analog data to be converted into sound from the speaker 156. In one embodiment, the audio adapter generates electrical current that drives magnets or similar ferromagnetic elements (not shown) within the speaker 156, thus moving a cone (also not shown) go generate sound.

In one embodiment, computer 102 also includes a wireless transceiver 158, which is able to transmit and/or receiver wireless signals (e.g., radio frequency (RF) signals). Such wireless signals may be broadcast locally, or onto a wireless network (e.g., network 128 if network 128 has wireless capabilities).

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
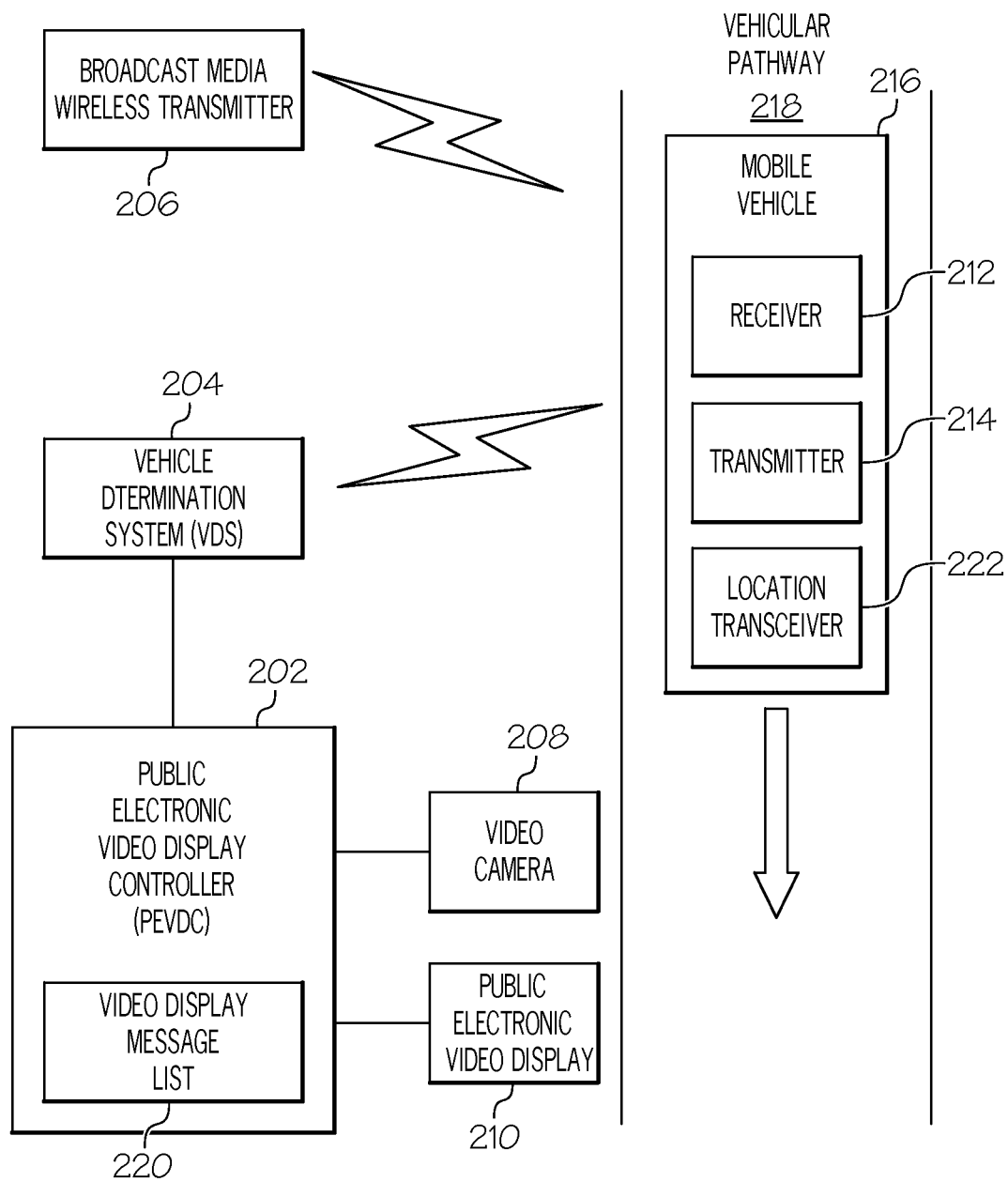
FIG. 2 illustrates an exemplary embodiment of the present invention on a vehicular pathway.

The present invention is directed to managing the content being displayed on a public electronic video display, such as an electronic billboard. In one or more embodiments, the present invention dynamically adjusts the content of the electronic billboard according to types of vehicles passing by, locations of vehicles, and/or content being presented on other media (e.g., radio programs). With reference then to FIG. 2, an exemplary embodiment of the present invention is presented. As depicted, a mobile vehicle 216 is traveling on a vehicular pathway 218. While mobile vehicle 216 is described as a land-based motor vehicle in various embodiments of the present invention (and thus vehicular pathway 218 is a roadway such as a highway, street, etc.), in other embodiments mobile vehicle 216 is a water-based craft (e.g., a boat, a paddle board, etc.), and thus the vehicular pathway 218 is a waterway. In one embodiment, mobile vehicle 216 is actually a pedestrian carrying an electronic device, such as a smart phone, a tablet computer, etc., and thus vehicular pathway 218 is just a sidewalk. Similarly, a mobile vehicle 216 may be an aircraft, such as a helicopter, that is traveling through an airway (e.g., a slow hover) in a manner that allows occupants of the aircraft to view signage adjacent to the airway (e.g., in a hover taxiway).

Physically proximate to the vehicular pathway 218 is a public electronic video display 210, such as an electronic billboard. The present invention controls the content being displayed on the public electronic video display 210 utilizing one or more of the devices and/or processes described herein. The public electronic video display 210 is controlled by a Public Electronic Video Display Controller (PEVDC) 202, which in one or more embodiments holds (or at least has access to) a video display message list 220. Thus, the public electronic video display 210 displays one or more messages from the video display message list 220 that are appropriate for occupants of the mobile vehicle 216.

The video display message list 220 may be a listing stored within the PEVCD 202, or it may be located in a database that is external to, but accessible by (e.g., via a network), the PEVCD 202. In one embodiment, entries in the video display message list 220 are specific for a particular audience. For example, if a determination is made that the desired audience is professional truck drivers, then a message may be "Truck Stop: Next Exit". However, if a determination is made that the desired audience is a vacationer, then a message may be "Tourist Attraction: Next Exit".

In one embodiment, the messages are categorized and sorted within the video display message list 220 according to their topics and/or intended audience. For example, one "folder" (i.e., set of files) of messages may be devoted to professional truck drivers, while another folder of messages may be devoted to vacationers, while another folder of messages may be devoted to first responders (e.g., police, fire, ambulance), etc.

In one or more embodiments, the present invention further tailors what is shown on the public electronic video display 210 based on what is being broadcast by a broadcast media wireless transmitter 206 (e.g., a radio station) to a radio (e.g., receiver 212) within the mobile vehicle 216.

In one or more embodiments of the present invention, a video camera 208 records an image of vehicles traveling along the vehicular pathway 218. In various embodiments, these images are used to categorize the types of vehicles being photographed, determine traffic patterns, etc. Image analysis of videos of the passing vehicles, thus leading to their categorization, may be performed in various manners.

In one embodiment, such image analysis is size-based. That is, assume that the video camera 208 captures an image of the mobile vehicle 216 on an image sensor (not shown) within the video camera 208. Examples of such image sensors include arrays of charge-coupled devices (CCDs) or complementary metal oxide semiconductors (CMOS) transistor devices that respond to focused light to generate an image. If the image sensor detects a moving object that traverses more than a predetermined area of the image sensor, then the detected mobile vehicle 216 is deemed to be a large vehicle such as a tractor-trailer rig, a bus, etc. That is, changes to the CCD/CMOS elements are caused by the moving image of the mobile vehicle 216. If a certain (large) percentage of these CCD/CMOS elements change as a group (i.e., as the mobile vehicle 216 passes by, thus causing changes to a large area of the image sensor), then this larger percentage of changing CCD/CMOS elements indicate that the vehicle is large (i.e., a bus, tractor-trailer rig, etc.), and the displayed contents of the public electronic video display 210 are adjusted accordingly. Similarly, if the video camera 208 detects a smaller mobile vehicle 216 (e.g., a family sedan), then the displayed contents of the public electronic video display 210 are adjusted for expected occupants of the smaller mobile vehicle 216.

In one embodiment, determining the likely types of occupants of a particular size of mobile vehicle 216 is performed using a lookup table (not shown). For example, a lookup table within the PEVDC 202 may contain a table that associates tractor-trailer rigs with a certain demographic, while smaller sedans are associated with another demographic, based on historical records of typical drivers/occupants of such vehicle types.

In one embodiment, such image analysis is light intensity based. For example, assume that an emergency vehicle, which has on its emergency lights, is approaching the video camera 208. The CCD/CMOS elements in the image sensor within the video camera 208 detect light intensities that are greater than those of ordinary headlights. When this intense level of light is detected by the video camera 208, the PEVDC 202 determines that the approaching mobile vehicle 216 is an emergency vehicle, and adjusts the contents of the public electronic video display 210 accordingly.

In one or more embodiments of the present invention, a transmitter 214 within the mobile vehicle 216 discloses an identification of the mobile vehicle 216 and/or one or more occupants of the mobile vehicle 216 to a Vehicle Determination System (VDS) 204. In one or more embodiments of the present invention, VDS 204 is also able to determine a current real-time location of the mobile vehicle 216 using Global Positioning System (GPS) data from a GPS transmitter (e.g., transmitter 214).

Note that various processes can be used to identify actual or predicted occupants of a particular type of mobile vehicle 216 that is approaching the public electronic video display 210. For example, as discussed above, a prediction can be made that any passenger/driver of a sedan (as determined by the size of the mobile vehicle 216, and/or by matching the video image of the mobile vehicle 216 to a stored image using point-based image analysis such as matching known points on the mobile vehicle 216 to known patterns of points on certain vehicle types) is of a certain demographic, and the content of the public electronic video display 210 is adjusted accordingly. In another embodiment, however, images of the occupants themselves are captured by the video camera 208. These images are digitized and compared to images from an image list (not shown) within the PEVDC 202. While in one embodiment these stored images in the image list may be stereotypes (used to identify a particular demographic of persons), in another embodiment the stored images are digitized images of actual persons, which are used to match (i.e., adjust) the content being displayed on the public electronic video display 210 to an actual occupant of the approaching mobile vehicle 216.

Note that in one or more embodiments of the present invention, PEVDC 202 and/or VDS 204 are hardware devices that utilize/have one or more processors (e.g., processor 104 shown in FIG. 1), and thus are not software entities.

Figure 3:
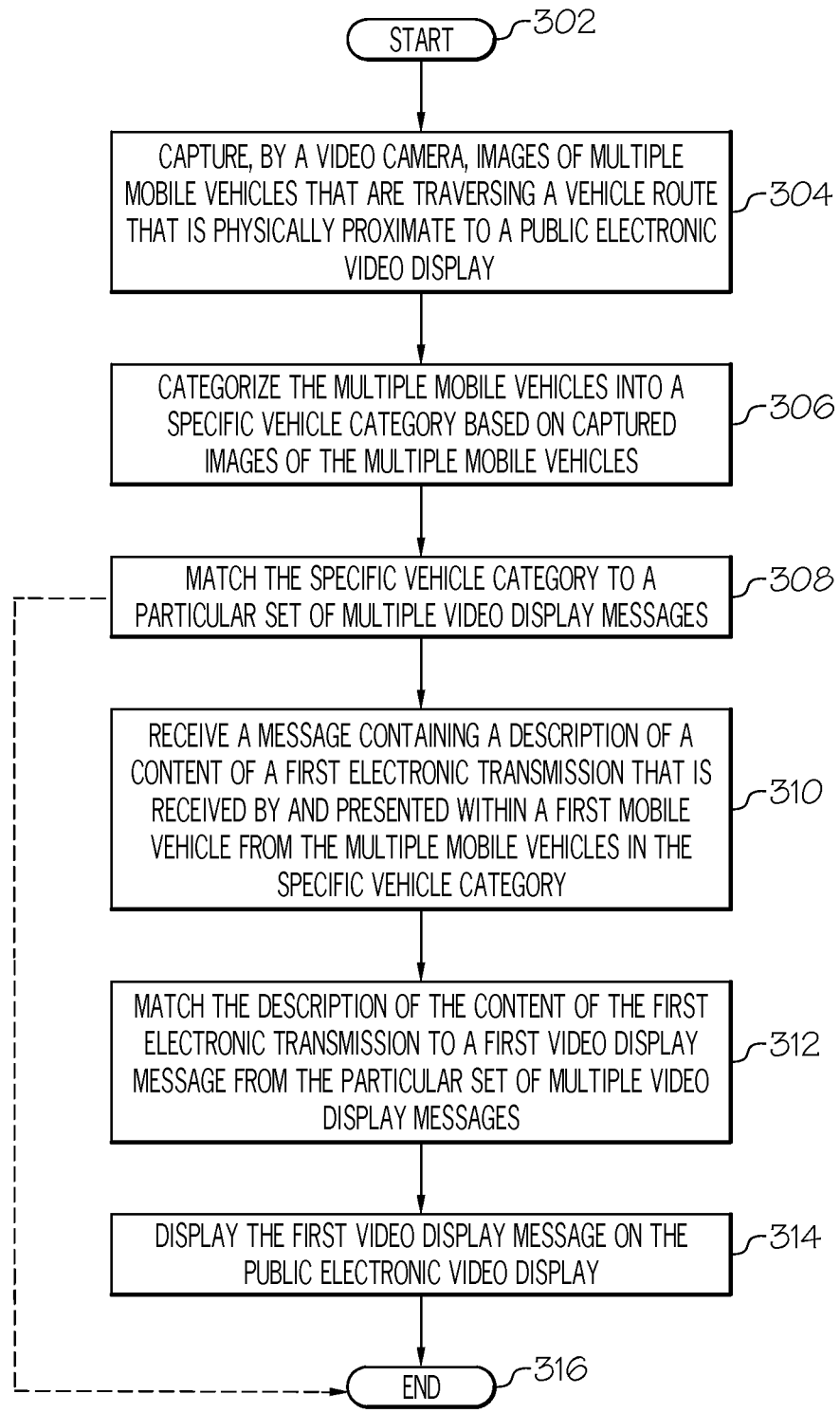
FIG. 3 is a high level flow-chart of one or more operations performed by one or more processors or other hardware devices to optimize a display of messages on a public electronic video display.

With reference now to FIG. 3, a high level flow-chart of one or more operations performed by one or more processors or other hardware devices to optimize a display of messages on a public electronic video display is presented.

After initiator block 302, a video camera (e.g., video camera 208) shown in FIG. 2 captures images of multiple mobile vehicles (of which the mobile vehicle 216 in FIG. 2 is one instance) that are traversing a vehicular pathway (e.g., vehicular pathway 218 shown in FIG. 2), as described in block 304. As depicted in FIG. 2, the vehicular pathway is physically proximate to (e.g., next to) a public electronic video display (e.g., public electronic video display 210 shown in FIG. 2).

In one embodiment, the public electronic video display 210 is an electronic billboard. Electronic billboards are capable of dynamically displaying messages, images, etc. That is, in one embodiment, an electronic billboard is merely an array of incandescent, fluorescent, and/or similar light bulbs that, when lit in a specific pattern, are capable of spelling out words, crude images, etc. In another embodiment, the electronic billboard is simply a very large scale video display, such as a light emitting diode (LED) display that has tens of thousands of LEDs. When activated in various patterns, these LEDs present detailed images, static or animated (moving), of persons, places, things, etc., as well as text information.

As described in block 306, the multiple mobile vehicles that are photographed by the video camera are then categorized (e.g., by the PEVDC 202 and/or VDS 204 shown in FIG. 2) into a specific vehicle category based on their captured images.

As described in block 308, the specific vehicle category is matched to a particular set of multiple video display messages (e.g., video display message list 220 shown in FIG. 2). That is, a specific set of video messages (e.g., those found in video display message list 220) are appropriate for a specific vehicle category (e.g., semi tractor-trailer rigs, minivans, sports cars, etc.), and are matched up accordingly. This allows messages that are appropriate for occupants of a certain type of vehicle (e.g., minivans) to be shown certain types of messages (from the particular set of multiple video display messages). In one embodiment, the process thus ends at terminator block 316. However, in another embodiment, additional steps are taken to coordinate the contents being displayed on the public electronic video display 210 with content from a broadcast media wireless transmitter 206 (e.g., a public radio broadcast).

Thus, as described in block 310, a message containing a description of a content of a first electronic transmission is received (e.g., by PEVDC 202 shown in FIG. 2). This first electronic transmission is received by and presented within a first mobile vehicle from the multiple mobile vehicles in the specific vehicle category. For example, assume that the first electronic transmission is a radio broadcast from the broadcast wireless transmitter 206, and that this radio broadcast is received by and converted into sound by a radio (e.g., receiver 212) within the motor vehicle (e.g., mobile vehicle 212). As described in block 312 of FIG. 3, the description of the content of the first electronic transmission is then matched to a first video display message from the particular set of multiple video display messages. For example, if the radio broadcast is about a certain athletic team, then the messages from that particular set of multiple video display messages may all be related to that athletic team, including offers for ticket sales, team apparel, etc.

As described in block 314, the first video display message is then displayed on the public electronic video display, and the process ends at terminator block 316.

Thus, in one embodiment of the present invention, the content displayed on a public electronic video display (such as an electronic billboard) is determined by what types of vehicles (i.e., vehicles in a "specific vehicle category") are passing by the electronic billboard, while in another embodiment the content is specific for occupants (either specific occupants or the demographic stereotype of occupant within the vehicle), as described above.

In one embodiment of the present invention, a current location of the first mobile vehicle is identified, the first video display message, which matches the description of the content of the first electronic transmission, is displayed on the public electronic video display in response to the current location of the first mobile vehicle being within a predetermined distance of the public electronic video display. That is, in one embodiment of the present invention, a first mobile vehicle (e.g., a motor vehicle on a highway, such as mobile vehicle 216 traveling on vehicular pathway 218 in FIG. 2) approaches the electronic billboard (e.g., the public electronic video display 210 shown in FIG. 2). The system (e.g., video camera 208, VDS 204, and/or PEVDC 202 in FIG. 2) identifies 1) what type of vehicle describes the first mobile vehicle, and 2) the position of the first mobile vehicle relative to the location of the electronic billboard. In response to the motor vehicle getting close enough to the electronic billboard (e.g., within a predetermined distance of the public electronic video display), the first video display message that is tailored for occupants of that first mobile vehicle is displayed.

In one embodiment of the present invention, a time of day that the images of multiple mobile vehicles that are traversing the vehicular pathway were captured is identified, wherein the images were captured on a first date; and the first video display message is displayed on the public electronic video display on a second date during the time of day that the images of multiple mobile vehicles that were traversing the vehicular pathway were captured, wherein the second date is subsequent to the first date. For example, assume that the images of the multiple vehicles were captured between the hours of 6:00 AM and 10:00 AM on a Monday. Assume further that a determination has been made that a large percentage of the passing vehicles are tractor-trailer rigs ("semis"). Thus, content displayed on the electronic billboard between 6:00 AM and 10:00 AM the following day(s), the following Monday(s), etc. may be tailored to occupants/drivers of semis.

While the determination of what percentage of vehicles are of a particular type can be performed using gross numbers (e.g., counting how many semis pass by between 6:00 AM and 10:00 AM, counting the total number of vehicles that pass by between 6:00 AM and 10:00 AM, and then using division to determine what percentage of passing vehicles between 6:00 AM and 10:00 AM are semis), in one embodiment a more sophisticated process is used to determine what percentage of passing vehicles are of a particular type (e.g., semis). For example, in one embodiment a Bayesian probability formula can be applied to the problem.

An exemplary Bayesian probability formula is:

$$P(A \mid B) = \frac{P(B \mid A)P(A)}{P(B)}$$

where:
P(A|B) is the probability that a mobile vehicle approaching the public electronic video display on the vehicle route is a member of the specific vehicle category (A) given that (|) a predefined condition of the vehicle route is currently being met (B);
P(B|A) is the probability that the predefined condition of the vehicle route is currently being met (B) given that (|) the mobile vehicle approaching the public electronic video display on the vehicle route is a member of the specific vehicle category (A);
P(A) is the probability that the mobile vehicle approaching the public electronic video display on the vehicle route is a member of the specific vehicle category regardless of any other information; and
P(B) is the probability that the probability that the predefined condition of the vehicle route is currently being met regardless of any other information.

In the example of time-based observations just presented, assume that the predefined condition of the vehicle route is that the time is between the hours of 6:00 AM and 10:00 AM. Thus, 4 hrs/24 hrs=0.167, making P(B)=0.167. Assume further that the specific vehicle category is tractor-trailer rigs ("semis"). Based on historical data, it is known that 2% of vehicles on the highway are semis, thus P(A) is 0.02. Furthermore, historical data shows that between the hours of 6:00 AM and 10:00 AM, 30% of the vehicles on the highway are semis. Thus, the probability of the time being between 6:00 AM and 10:00 AM given that at least one vehicle on the highway is a semi is at least 30% (i.e., P(B|A)≈0.30). Based on these probabilities, then the probability P(A|B) that a mobile vehicle on the vehicle route approaching the public electronic video display is a semi (A) given that (|) it is between 6:00 AM and 10:00 AM is 3.5%:

$$P(A \mid B) = \frac{.30 * .02}{.167} = .035$$

In another example, assume that the predefined condition of the vehicle route is a snow storm, which occurs on a particular highway 3% of the time. Thus, P(B) is 0.03. Continue to assume that the specific vehicle category is tractor-trailer rigs ("semis"), and that 2% of vehicles on the highway are semis, such that P(A) is 0.02. Furthermore, historical data shows that during a snow storm, 95% of the vehicles on the highway are semis, whose drivers are motivated by the weight of their vehicles, schedule and pay demands, etc. to drive through the snow storm. Thus, the probability of there being a snow storm on the highway given that at least one vehicle on the highway is a semi is at least 95% (i.e., P(B|A)≈0.95). Based on these probabilities, then the probability P(A|B) that a mobile vehicle approaching the public electronic video display on the vehicle route is a semi (A) given that (|) it is snowing on the highway (B) is now up to 57%:

$$P(A \mid B) = \frac{.95 * .02}{.03} = .57$$

Thus, in one or more embodiments, a statistical analysis is used to determine what types of vehicles are passing by (and/or will be passing by) the electronic billboard.

In one embodiment of the present invention, the specific vehicle category is assigned to a particular demographic; the particular demographic is matched to a second video display message from the plurality of video display messages; and the first video display message is replaced with the second video display message for display on the public electronic video display. For example, assume that a hardware device (e.g., the PEVDC 202 shown in FIG. 2) interrogates a database (e.g., a State drivers' license database, a marketing database, etc.), thus revealing that 85% of tractor trailer rig drivers are male. Thus, "male" describes a particular demographic of drivers. This demographic is then matched to one or more video display messages (e.g., from the video display message list 220) that target this male audience, such that those video display messages are displayed to this male audience. That is, identifying the specific vehicle category of the mobile vehicle as being "tractor-trailer rigs", matching "tractor-trailer rigs" to "male drivers", and matching "male drivers" to specific video display message(s), the content displayed by the electronic billboard is tailored to a target audience that is within a mobile vehicle that is approaching the electronic billboard.

In one embodiment of the present invention, a license plate on the mobile vehicle is matched with a registered owner of the mobile vehicle; the registered owner of the mobile vehicle is matched to a second video display message from the plurality of video display messages; and the first video display message is replaced with the second video display message for display on the public electronic video display. For example, assume that a hardware device (e.g., the video camera 208 and the PEVDC 202 shown in FIG. 2) identifies the license plate of a particular vehicle, and then interrogates a database (e.g., a State vehicle license plate database) to reveal the identity of the owner of that particular vehicle. Having this information allows the system (e.g., PEVDC 202) to not only adjust the content of the message being displayed by the electronic billboard according to the demographic of the vehicle owner (accessible by knowing that person's name), but also to data mine various databases (e.g., social network websites, purchasing history databases, etc.) to determine more specific interests/purchasing history/ etc. of the owner of a particular vehicle. Thus, whatever was being displayed on the electronic billboard is replaced with a more user-specific message as the mobile vehicle approaches the electronic billboard.

In one embodiment of the present invention, a corporate logo on the mobile vehicle is matched to a second video display message from the plurality of video display messages; and the first video display message is replaced with the second video display message for display on the public electronic video display. For example, assume that a hardware device (e.g., the video camera 208 and the PEVDC 202 shown in FIG. 2) identifies a company logo on a particular vehicle, and then interrogates a database of company logos to identify what company the driver works for. Having this information allows the system (e.g., PEVDC 202) to tailor the content of the message being displayed by the electronic billboard for that company. In one embodiment, this content is generic information useful to any employee of that company (e.g., a reminder that the company will be closed during the next holiday). In one embodiment, recognizing what company owns the particular vehicle can allow the system (e.g., PEVDC 202) to be linked to a system owned by that company, thus tailoring the message even more specifically. For example, assume that the company database for "Company X" knows that "Driver A" is scheduled to be driving past the public electronic video display 210 on the vehicular pathway 218 (shown in FIG. 2) at a particular time range on a certain date. By recognizing the vehicle as being owned by "Company X" according to the recognized logo, a specific message for "Driver A" can be presented on the public electronic video display 210 (e.g., "Driver A—Go see Customer X in 3 miles").

In one embodiment of the present invention, the public electronic video display is mounted on a second mobile vehicle. That is, rather than having a public electronic video display 210 affixed to a permanent fixed structure (i.e., an electronic billboard mounted on a pole that is anchored into the ground), in this embodiment the public electronic video display is an electronic display (i.e., a large video display) that is mounted on the side, front, back, and/or top of a motor vehicle such as a truck, taxi cab, etc. Being mobile, the physical location of the vehicle-mounted electronic display changes. Thus, in one embodiment of the present invention in which the public electronic video display is mounted on a vehicle, a physical location of the second mobile vehicle (on which the public electronic video display is mounted) relative to the first mobile vehicle (whose occupants will be viewing the public electronic video display) is determined. For example, assume that the first mobile vehicle is following the second mobile vehicle. A proximity sensor within the first mobile vehicle will determine how close the first and second mobile vehicles are to one another. In one embodiment, the two vehicles each have location-determining systems (e.g., GPS systems) that identify their respective real-time locations. Electronic communication between the two vehicles then allows a system (e.g., a GPS-enabled location transceiver, such as location transceiver 222 depicted in FIG. 2, in each of the two vehicles) to calculate how far apart the two vehicles are in real time. Thus, the system determines whether the physical location of the second mobile vehicle orients the public electronic video display to be visible to an occupant of the first mobile vehicle by 1) the two vehicles being close enough to each other, and 2) that the first vehicle is behind the second vehicle (assuming that the public electronic video display is mounted on the back of the second vehicle). If the two vehicles are properly aligned (e.g., in response to determining that the electronic video display on the second mobile vehicle is visible to the occupant of the first mobile vehicle), then the first video display message is displayed on the public electronic video display that is mounted on the second mobile vehicle.

In one embodiment in which the public electronic video display is mounted on a moving vehicle, a second video display message is matched with a predefined road condition; the predefined road condition ahead of the second mobile vehicle is determined; and in response to detecting the predefined road condition ahead of the second mobile vehicle, the first video display message is replaced with the second video display message for display on the public electronic video display. For example, assume that the first mobile vehicle is following the second mobile vehicle that has the public electronic video display mounted on the back. Assume further that the leading vehicle (the "second mobile vehicle") detects a road hazard ahead, such as wet pavement, snow, road construction, etc. This detection may be performed using readings from the vehicle's anti-skid system (e.g., its antilock braking system—ABS), ambient air thermometer, a forward-looking video camera with image recognition capability, etc. Once the road hazard (or other predefined road condition) is identified, it is matched to a particular video display message (e.g., from the video display message list 220 shown in FIG. 2, assuming that the lead vehicle has access to this list). The public electronic video display mounted on the back of the lead (second) vehicle then replaces the previous video display message with a new video display message that is related to the newly-detected road condition.

For example, assume that readings from the vehicle's anti-skid system, ambient air thermometer, a forward-looking video camera with image recognition capability, etc. are received by a local processor (within the second mobile vehicle), which makes the determination that road conditions are icy. The local processor then matches the road condition category "icy" with messages in its video display message list 220 that are categorized as being relevant to "icy" road conditions. Such categories may be according to which folder the "icy" messages are stored in, or the "icy" messages may be within a particular column of file names of messages devoted to "icy" road conditions, or each message may simply have a metadata tag or other component that identifies it as being relevant to "icy" road conditions.

In one embodiment of the present invention in which the public electronic video display is mounted on a second mobile vehicle, a particular location of the second mobile vehicle is matched to a second video display message from the plurality of video display messages; a current location of the second mobile vehicle is determined; and in response to determining that the second mobile vehicle is currently within the particular location, the first video display message on the public electronic video display is replaced with the second video display message. For example, assume that a truck (that has an electronic display mounted on its side) is initially driving through a theater district of a city. The GPS system on the truck will direct the PEVDC 202 (shown in FIG. 2, and either located within the truck or in wireless communication with the truck) to display messages related to tickets, show times, advertisements, etc. related to the theater. However, as the truck later drives through a suburban area, then the displayed message on the electronic display will change to information about home improvement, Little League, school announcements, etc., that are more appropriate for the suburbs.

In one embodiment of the present invention, a particular time of day is matched with a second video display message from the plurality of video display messages; a current time of day at a location of the public electronic video display is determined; and in response to determining that the current time of day at the location of the public electronic video display is the particular time of day, the first video display message on the public electronic video display is replaced with the second video display message. For example, assume that the public electronic video display 210 (either at a fixed location as depicted in FIG. 2 or mounted on a moving vehicle as described above) is displaying messages. A clock (not depicted) associated with the public electronic video display 210 is able to provide the current time (e.g., 1:00 PM) to the PEVDC 202. The PEVDC 202 then consults a lookup table associated with the video display message list 220, which associates certain video display messages with certain times of the day. For example, advertisements for breakfast may be presented from 6:00 AM to 10:00 AM, while advertisements for supper may be presented from 5:00 PM to 9:00 PM.

In one embodiment of the present invention, a particular annual season is matched to a second video display message from the plurality of video display messages; a current annual season at a location of the public electronic video display is determined; and in response to determining that the current annual season at the location of the public electronic video display is the particular annual season, the first video display message on the public electronic video display is replaced with the second video display message. For example, assume that the public electronic video display 210 (either at a fixed location as depicted in FIG. 2 or mounted on a moving vehicle as described above) is displaying messages. An electronic calendar (not depicted) associated with the public electronic video display 210 is able to provide the current season (e.g., summer, winter, "back to school", etc.) to the PEVDC 202. The PEVDC 202 then consults a lookup table associated with the video display message list 220, which associates certain video display messages with certain seasons. For example, advertisements for swimsuits may be presented during the summer, while advertisements for school supplies may be presented during the "back to school" season (e.g., the last two weeks of August).

In one embodiment of the present invention, a field of view within which the public electronic video display is visible is defined; a moving location of the first mobile vehicle is tracked; and in response to determining that the first mobile vehicle has left the field of view, the first video display message on the public electronic video display is replaced with a second video display message. For example, consider again the mobile vehicle 216 shown in FIG. 2. Assume that the public electronic video display 210 is only visible to vehicles that are within 300', and are in the line of sight of, the public electronic video display 210. Once the vehicles pass the public electronic video display 210, the contents of the public electronic video display 210 are no longer visible (i.e., the passing vehicles are no longer within the field of view of the public electronic video display 210). Note that in one or more embodiments of the present invention, the first mobile vehicle is in a specific vehicle category (e.g., is a tractor-trailer rig), and the first video display message is tailored for drivers of such vehicles. However, once the tractor-trailer rig passes the public electronic video display 210, then the message for drivers of tractor-trailer rigs is replaced with another message, such as a generic message ("Drive Safely"), or a specifically-tailored message to another vehicle category (e.g., minivans), using embodiments of the invention described herein. As noted above, the type of vehicle can be detected by a video sensor within the video camera being stimulated with light from a moving object, that is then matched to a set of video files that describe a certain type of vehicle. When the video sensor no longer detects movement of this type of vehicle, or when the video sensor no longer detects the vehicle at all (by matching captured video images with video files of known types of vehicles), then the generic message returns to the public electronic video display 210.

In one embodiment of the present invention, a determination is made as to whether the public electronic video display is within a predetermined distance of the first mobile vehicle; and in response to determining that the public electronic video display is within the predetermined distance of the first mobile vehicle, the first electronic transmission is overridden with a second electronic transmission. For example, assume that the mobile vehicle 216 is approaching the public electronic video display 210 shown in FIG. 2. Assume further that the VDS 204, using GPS readings from the location transceiver 222 in the mobile vehicle 216, is able to track the real-time location of the mobile vehicle, particularly with relation to its position/distance from the public electronic video display 210. Thus, in one embodiment, when the VDS 204 determines that the mobile vehicle 216 is within a predetermined distance of the public electronic video display 210 (e.g., with 200'), then whatever was being displayed on the public electronic video display 210 before is now replaced with a new message (which will be tailored for occupants of that vehicle).

In another embodiment, again assume that the public electronic video display is mounted on a second mobile vehicle (as described above). In this embodiment, assume further that the first mobile vehicle (holding persons who will be viewing the public electronic video display) and/or the second mobile vehicle (on which the public electronic video display is mounted) is equipped with a proximity sensor, which tells the second mobile vehicle how far away the first mobile vehicle is. As soon as the two vehicles are within some predetermined proximity level (e.g., are within 50' of one another), then the electronic message that is tailored for occupants of the first mobile vehicle replaces whatever message is currently being displayed on the public electronic video display mounted on the second mobile vehicle.

In one embodiment of the present invention, an occupant of the mobile vehicle is presented with an option to opt out of a customized video display program; and in response to receiving a message from the occupant to opt out of the customized video display program, a display of the first video display message to the mobile vehicle is blocked. That is, if a particular person does not wish to be presented with customized messages on a public electronic video display 210 (either stationary as in FIG. 2 or vehicle-mounted and thus mobile as described above), then a transmitter 214 can send a signal to the PEVDC 202, directing the PEVDC 202 to ignore the mobile vehicle 216, thus leaving the message shown on the public electronic video display 210 unaltered/unaffected by the presence of the mobile vehicle 216.

In one embodiment of the present invention, the first electronic transmission described herein (which is used in one or more embodiments to be synchronized and/or otherwise correlated with the message being displayed on the public electronic video display) is a publicly broadcast radio transmission (e.g., music, news, weather from a local and/or satellite radio station).

In one embodiment of the present invention and as described herein, the first mobile vehicle is a motor vehicle, and the vehicular pathway is a highway or other roadway.

In one embodiment of the present invention and as described herein, the first mobile vehicle is a watercraft such as a boat, paddle board, etc., and the vehicular pathway is a waterway.

In one embodiment, it is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
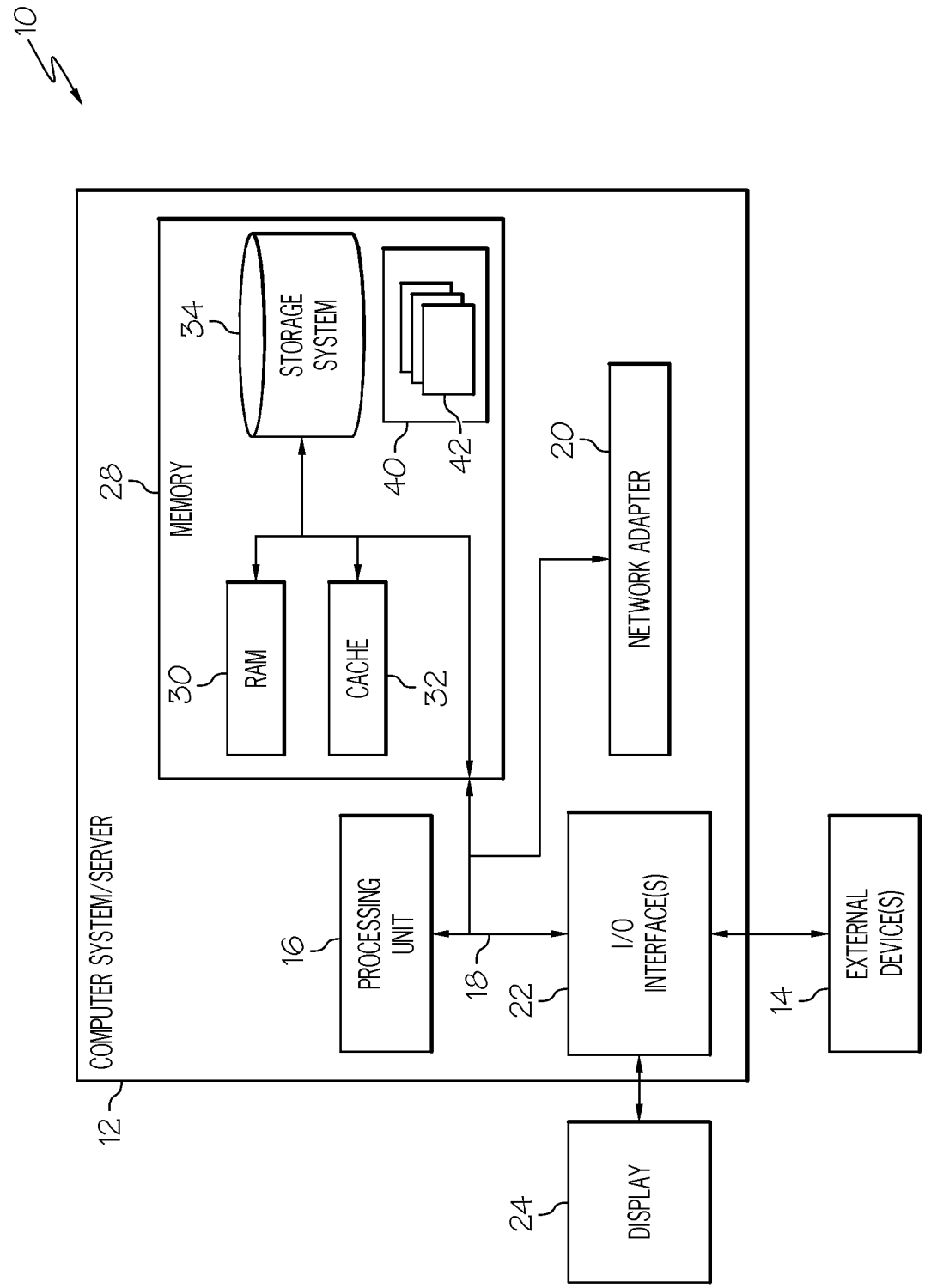
FIG. 4 depicts a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/ server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Note that external devices 14 that can utilize the computer system/server 12 shown in FIG. 4 include, but are not limited to, the video camera 208, the public electronic video display 210, the VDS 204, the PEVDC 202, the receiver 212, the transmitter 214, and/or the location transceiver 222 shown in FIG. 2. That is, some or all of these devices may be cloud resources that are accessible and/or utilized by the cloud server depicted as computer system/server 12. For example, various video images from multiple video cameras (of which the video camera 208 depicted in FIG. 2 is a single instance) may be shared through the cloud system described in the cloud computing environment 50 depicted in FIG. 5. Similarly, multiple public electronic video displays, of which the public electronic video display 210 in FIG. 2 is a single instance, may be shared on the cloud, thus coordinating information being displayed on the multiple public electronic video displays.

Figure 5:
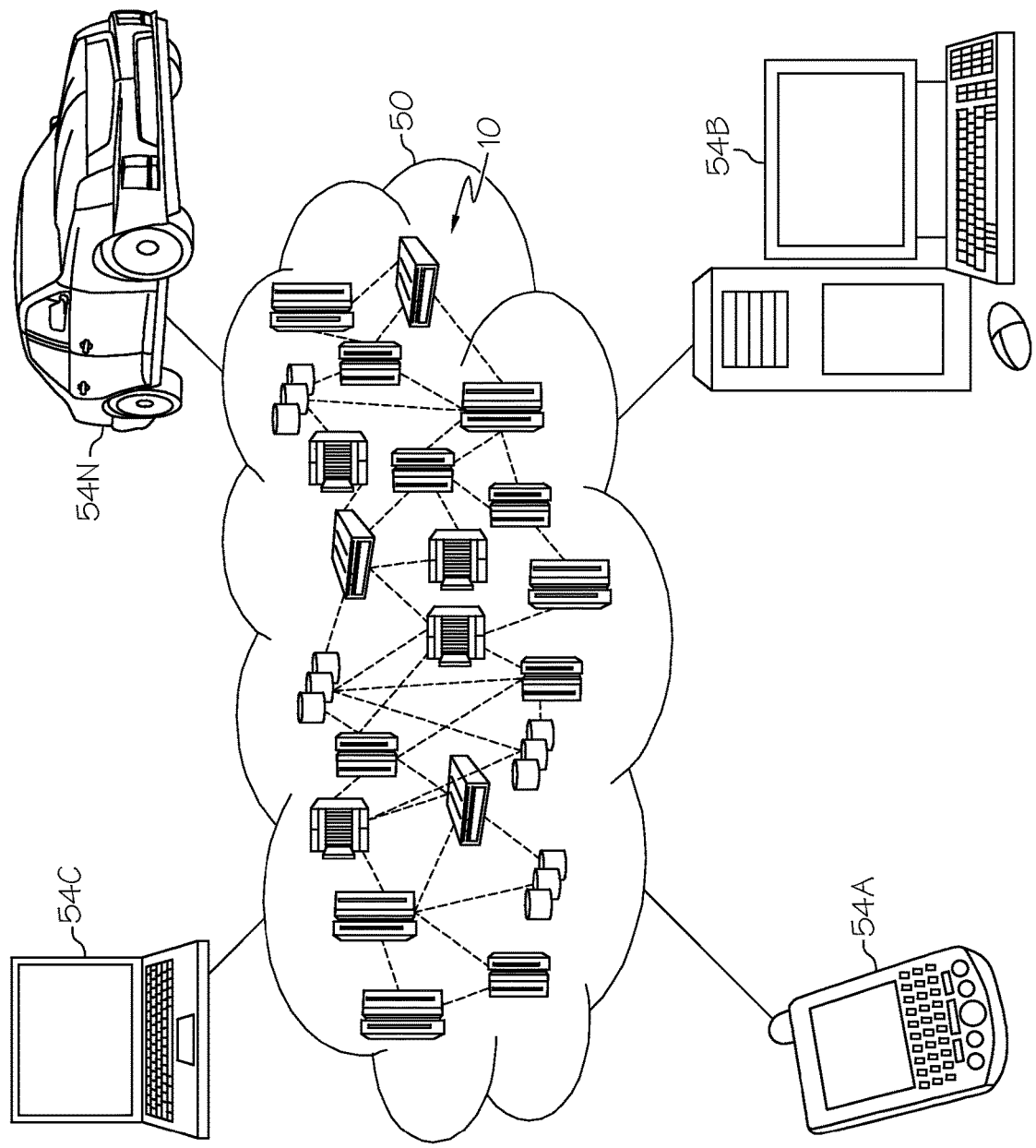
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices MA-N shown in FIG. 5 are intended to be illustrative only and that computing nodes 10 and cloud computing environment 50 can communicate with any type of computerized device over any type of network and/or network addressable connection (e.g., using a web browser).

Figure 6:
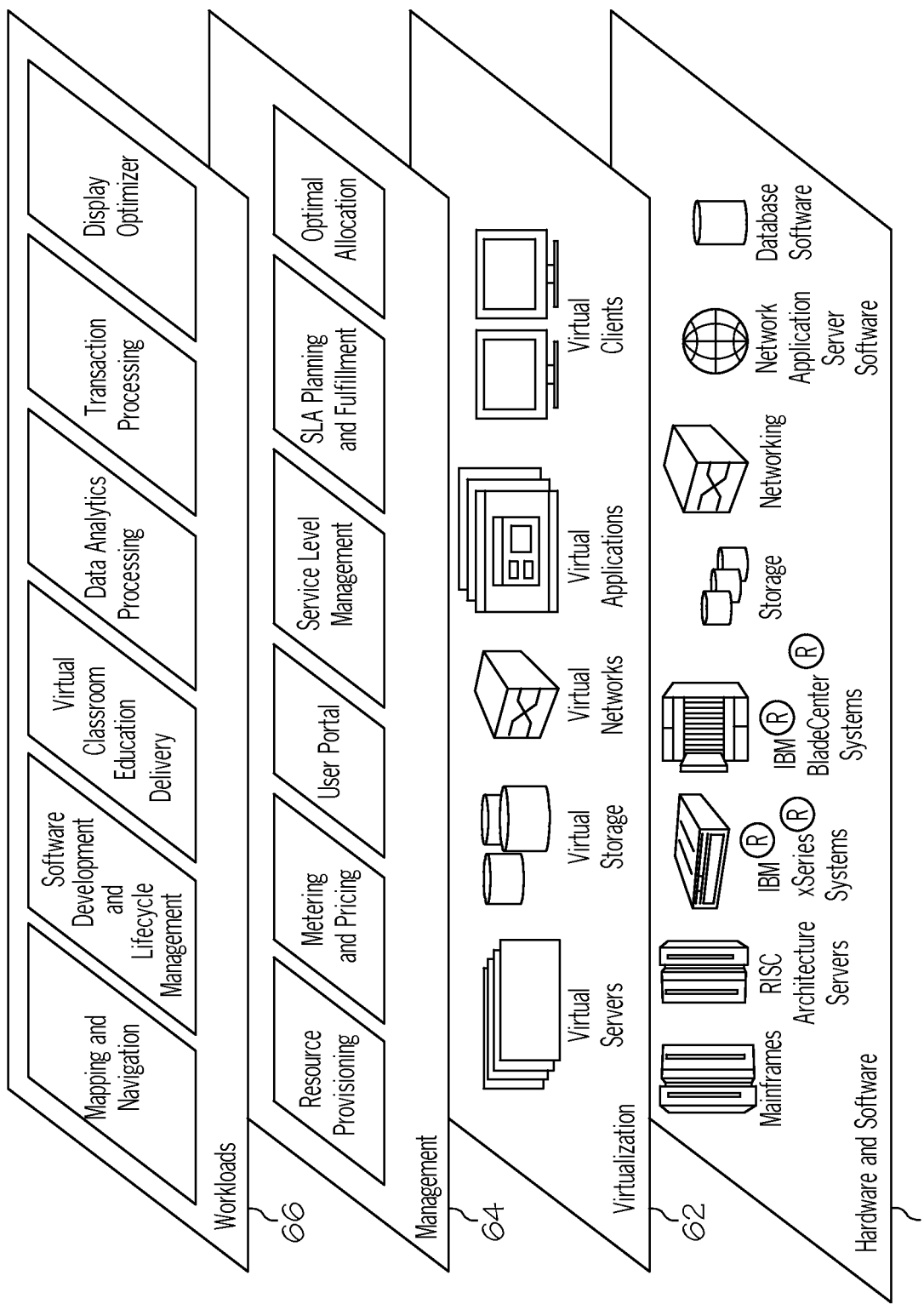
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and optimizing messaging displays, as described herein, and as represented by the "Display Optimizer" found in workloads layer 66.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method to optimize a display of messages on a public electronic video display, the method comprising:

receiving, by one or more processors, images captured, by a video camera, of multiple mobile vehicles that are traversing a vehicular pathway, wherein the video camera contains an electronic image sensor that comprises an array of sensor elements, and wherein the vehicular pathway is physically proximate to a public electronic video display;

categorizing, by one or more processors, the multiple mobile vehicles into a specific vehicle category based on captured images of the multiple mobile vehicles and without regard to types of occupants within the multiple mobile vehicles;

matching, by one or more processors, the specific vehicle category to a particular set of multiple video display messages;

determining, by one or more processors, a historical percentage of mobile vehicles of the specific vehicle category that previously passed by the public electronic video display during a particular time of day of a past date; and displaying, by one or more processors, a first video display message on the public electronic video display on a current date based on the historical percentage of mobile vehicles of the specific vehicle category that previously passed by the public electronic video display during the particular time of day of the past date;

determining, by one or more processors, that one or more of the array of sensor elements detects light emitted, from an approaching vehicle, that exceeds a predefined intensity level as the approaching vehicle approaches the public electronic video display;

determining, by one or more processors, that a pattern of points on the approaching vehicle matches a pattern of points for known emergency vehicles;

in response to determining that one or more of the array of sensor elements detects light emitted, from the approaching vehicle, that exceeds the predefined intensity level, and in response to determining that the pattern of points on the approaching vehicle matches the pattern of points for the known emergency vehicles, determining, by one or more processors, that the approaching vehicle is an emergency vehicle; and in response to determining that the approaching vehicle is an emergency vehicle, replacing, by one or more processors, the first video display message with a second video display message that is specific for emergency vehicles.

2. The method of claim 1, further comprising:

receiving, by a hardware receiver, a message containing a description of a content of a first electronic transmission, wherein the first electronic transmission is electronically received by and presented within a first mobile vehicle from the multiple mobile vehicles in the specific vehicle category; and matching, by one or more processors, the description of the content of the first electronic transmission to the first video display message from the particular set of multiple video display messages.

3. The method of claim 2, further comprising:

identifying, by one or more processors, a current location of the first mobile vehicle; and displaying, by one or more processors, the first video display message, which matches the description of the content of the first electronic transmission, on the public electronic video display in response to the current location of the first mobile vehicle being within a predetermined distance of the public electronic video display.

4. The method of claim 1, further comprising:

identifying, by one or more processors, a time of day that the images of the multiple mobile vehicles that are traversing the vehicular pathway were captured, wherein the images were captured on a first date; and displaying, by one or more processors, the first video display message on the public electronic video display on a second date during the time of day that the images of the multiple mobile vehicles that were traversing the vehicular pathway were captured, wherein the second date is subsequent to the first date.

5. The method of claim 1, further comprising:

capturing, by the video camera, an image of a recognized logo on a vehicle that is physically proximate to a public electronic video display, wherein the recognized logo identifies an owner of the vehicle that is physically proximate to the public electronic video display;

identifying, by one or more processors, a specific time that the vehicle with the recognized logo is physically proximate to the public electronic video display;

correlating, by one or more processors, the vehicle that is physically proximate to the public electronic video display with a known vehicle that is owned by the owner and that is scheduled to be physically proximate to the public electronic video display in order to identify the vehicle that is physically proximate to the public electronic video as being the known vehicle; and in response to the known vehicle passing by the public electronic video display, presenting, by one or more processors and on the public electronic video, instructions to the known vehicle to drive to a new location.

6. The method of claim 1, further comprising:

matching, by one or more processors, a corporate logo on the first mobile vehicle to a third video display message from the particular set of multiple video display messages; and replacing, by one or more processors, the first video display message with the third video display message for display on the public electronic video display.

7. The method of claim 1, wherein the public electronic video display is mounted on a second mobile vehicle, and wherein the method further comprises:

determining, by one or more processors, a physical location of the second mobile vehicle relative to the first mobile vehicle;

determining, by one or more processors, whether the physical location of the second mobile vehicle orients the public electronic video display to be visible to an occupant of the first mobile vehicle; and in response to determining that the electronic video display on the second mobile vehicle is visible to the occupant of the first mobile vehicle, displaying, by one or more processors, the first video display message on the public electronic video display that is mounted on the second mobile vehicle.

8. The method of claim 7, further comprising:
matching, by one or more processors, a third video display message with a predefined road condition;
detecting, by one or more processors, the predefined road condition ahead of the second mobile vehicle; and
in response to detecting the predefined road condition ahead of the second mobile vehicle, replacing, by one or more processors, the first video display message with the third video display message for display on the public electronic video display.

9. The method of claim 1, wherein a second public electronic video display is mounted on a mobile display vehicle, and wherein the method further comprises:
determining, by one or more processors, a first geographic location of the mobile display vehicle;
displaying, by one or more processors, the first video display message on the mobile display vehicle while the mobile display vehicle is in the first geographic location;
determining, by one or more processors, that the mobile display vehicle has moved to a second geographic location; and
in response to determining that the mobile display vehicle has moved to the second geographic location, replacing, by one or more processors, the first video display message on the second public electronic video display with a third video display message.

10. A method to optimize a display of messages on a public electronic video display, the method comprising:
receiving, by one or more processors, images captured by a video camera of multiple mobile vehicles that are traversing a vehicular pathway, wherein the vehicular pathway is physically proximate to a public electronic video display, and wherein the video camera contains an electronic image sensor that contains an array of sensor elements;
categorizing, by one or more processors, the multiple mobile vehicles into a specific vehicle category based on captured images of the multiple mobile vehicles and without regard to types of occupants within the multiple mobile vehicles;
matching, by one or more processors, the specific vehicle category to a particular set of multiple video display messages;
determining, by one or more processors, a historical percentage of mobile vehicles of the specific vehicle category that previously passed by the public electronic video display during a particular time of day of a past date;
displaying, by one or more processors, a first video display message on the public electronic video display on a current date based on the historical percentage of mobile vehicles of the specific vehicle category that previously passed by the public electronic video display during the particular time of day of the past date;
identifying, by one or more processors, a percentage of the sensor elements in the array of sensor elements that are activated by focused light from a particular moving vehicle, from the multiple mobile vehicles, that is approaching the public electronic video display;
determining, by one or more processors, that the percentage of the sensor elements in the array of sensor elements being activated as the particular moving vehicle is approaching the public electronic video display exceeds a predefined percentage;
determining, by one or more processors, that a pattern of points on the particular moving vehicle matches a pattern of points for known buses;
in response to determining that the percentage of the sensor elements in the array of sensor elements being activated as the particular moving vehicle is approaching the public electronic display exceeds the predefined percentage, and in response to determining that the pattern of points on the approaching vehicle matches the pattern of points for the known buses, determining, by one or more processors, that the particular vehicle is a bus; and
in response to determining that the particular moving vehicle is a bus, modifying, by one or more processors, the first video display message to display a modified message that is designed to be displayed to buses.

11. The method of claim 1, further comprising:
defining, by one or more processors, a field of view within which the public electronic video display is visible;
tracking, by one or more processors, a moving location of the first mobile vehicle; and
in response to determining that the first mobile vehicle has left the field of view, replacing, by one or more processors, the first video display message on the public electronic video display with a third video display message.

12. The method of claim 2, further comprising:
determining, by one or more processors, whether the public electronic video display is within a predetermined distance of the first mobile vehicle; and
in response to determining that the public electronic video display is within the predetermined distance of the first mobile vehicle, overriding, by one or more processors, the first electronic transmission with a second electronic transmission.

13. The method of claim 1, further comprising:
presenting, by one or more processors, an option to opt out of a customized video display program to an occupant of the first mobile vehicle; and
in response to receiving a message from the occupant to opt out of the customized video display program, blocking, by one or more processors, display of the first video display message to the first mobile vehicle and continuing to display an unaltered display message on the public electronic video display, such that the unaltered display message is unaffected by a presence of the first mobile vehicle.

14. The method of claim 2, wherein the hardware receiver is a radio for receiving public broadcasts from a public radio station, wherein the first electronic transmission is a publicly broadcast radio transmission from the public radio station, and wherein the method further comprises:
modifying, by one or more processors, the first video display message to create a modified first video display message, wherein the modified first video display message is based on content of the publicly broadcast radio transmission from the public radio station.

15. A method to optimize a display of messages on a public electronic video display, the method comprising:
receiving, by one or more processors, images captured by a video camera of multiple mobile vehicles that are traversing a vehicular pathway, wherein the vehicular pathway is physically proximate to a public electronic video display, and wherein the video camera contains an electronic image sensor that contains an array of sensor elements;

categorizing, by one or more processors, the multiple mobile vehicles into a specific vehicle category based on captured images of the multiple mobile vehicles and without regard to types of occupants within the multiple mobile vehicles;

matching, by one or more processors, the specific vehicle category to a particular set of multiple video display messages;

determining, by one or more processors, a historical percentage of mobile vehicles of the specific vehicle category that previously passed by the public electronic video display during a particular time of day of a past date;

displaying, by one or more processors, a first video display message on the public electronic video display on a current date based on the historical percentage of mobile vehicles of the specific vehicle category that previously passed by the public electronic video display during the particular time of day of the past date;

determining, by one or more processors, a probability that mobile vehicles of the specific vehicle category will pass by the public electronic video display at the particular time of day at a future date, wherein the probability that mobile vehicles of the specific vehicle category will pass by the public electronic video display at the particular time of day at the future date is determined by:

$$P(A \mid B) = \frac{P(B \mid A) P(A)}{P(B)}$$

where:

P(A|B) is a probability that a mobile vehicle approaching the public electronic video display on a vehicle route is a member of the specific vehicle category (A) given that (I) a predefined condition of the vehicle route is currently being met (B);

P(B|A) is a probability that the predefined condition of the vehicle route is currently being met (B) given that (I) the mobile vehicle approaching the public electronic video display on the vehicle route is a member of the specific vehicle category (A);

P(A) is a probability that the mobile vehicle approaching the public electronic video display on the vehicle route is a member of the specific vehicle category regardless of any other information; and P(B) is a probability that the probability that the predefined condition of the vehicle route is currently being met regardless of any other information;

determining, by one or more processors, that the probability that mobile vehicles of the specific vehicle category will pass by the public electronic video display at the particular time of day at the future date exceeds a predetermined level; and in response to determining that the probability that mobile vehicles of the specific vehicle category will pass by the public electronic video display at the particular time of day at the future date exceeds the predetermined level, displaying the first video display message on the public electronic video display at the particular time of day on the future date.

* * * * *